United States Patent [19]

Iwasaki

[11] Patent Number: 4,648,698

[45] Date of Patent: Mar. 10, 1987

[54] TRIPOD FOR CAMERA

[75] Inventor: Osamu Iwasaki, Tokorozawa, Japan

[73] Assignee: Hakuba Shashin Sagyo Kabushiki Kaisha, Tokyo, Japan

[21] Appl. No.: 814,210

[22] Filed: Dec. 27, 1985

[30] Foreign Application Priority Data

Sep. 13, 1985 [JP] Japan .......................... 60-139573[U]

[51] Int. Cl.$^4$ ...................... G03B 17/00; F16M 11/38
[52] U.S. Cl. ..................................... 354/293; 248/171
[58] Field of Search .......................... 354/81, 82, 293; 248/169–171

[56] References Cited

U.S. PATENT DOCUMENTS 2,297,927 10/1942 Whitman .............................. 248/171
2,668,682 2/1954 Dalton ................................ 248/169
4,582,410 4/1986 Niwaya ............................... 354/293

Primary Examiner—Donald A. Griffin
Attorney, Agent, or Firm—Lackenbach Siegel Marzullo & Aronson

[57] ABSTRACT

A tripod for a camera which comprises a left leg, a right leg and a center leg which are connected so as to extend adjacently in parallel with each other in the same plane when they are not used, said left leg and said right leg being pivotably connected, at a portion where the three legs are connected, so as to be swung within a predetermined angular range in said plane in the leftward and rightward directions, respectively, to be opened or closed, and said center leg being pivotably connected to said portion so as to swing in a direction perpendicular to said plane to be opened or closed.

1 Claim, 9 Drawing Figures

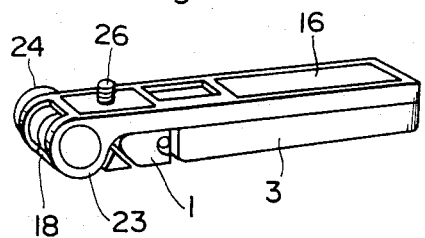
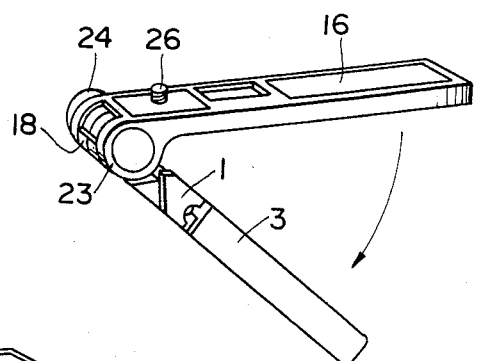
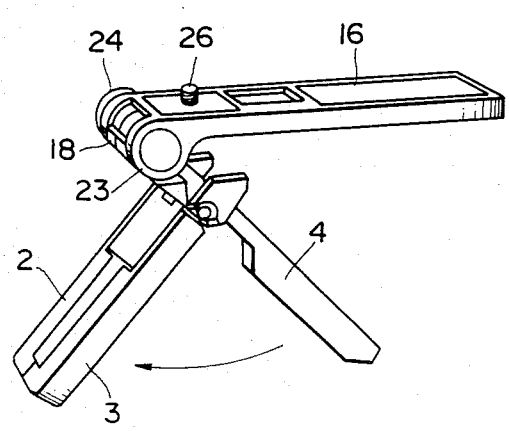
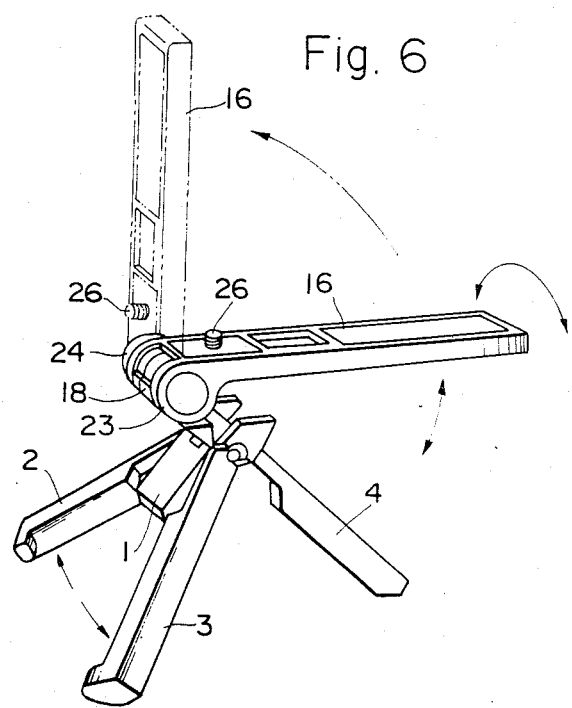

TRIPOD FOR CAMERA

BACKGROUND OF THE INVENTION a. Field of the Invention

This invention relates to a tripod for a small-sized camera, which is capable of remaining fitted to a bottom of the camera even when the camera is carried.

b. Related Arts

A conventional tripod for a camera is generally used in such a manner that it is fitted to the camera only when it is required and kept disengaged from the camera when it is out of use so as not to hinder the movement or the operation of the camera at the time of taking a photograph. The conventional tripod, thus, is very inconvenient because it necessitates a troublesome fitting operation whenever it is required.

OBJECT AND SUMMARY OF THE INVENTION

It is therefore an object of the present invention to provide a camera which is capable of obviating the problems involved in the conventional tripod and which is capable of remaining fitted, even when it is not used, to a lower portion of a camera body, assuming a box-like formation as if it is a part of the camera.

In accordance with the present invention, there is provided a tripod for a camera which comprises a left leg, a right leg and a center leg which are connected so as to extend adjacently in parallel with each other in the same plane when they are not used, said left leg and said right leg being pivotably connected, at a portion where the three legs are mounted, so as to be rotated within a predetermined angular range in said plane in the leftward and rightward directions, respectively, to be opened or closed, and said center leg being pivotably connected to said portion so as to be rotatable in a direction perpendicular to said plane to be opened or closed.

BRIEF DESCRIPTION OF THE DRAWINGS

FIG. 3 is a perspective view of the same, showing it in the closed position;

FIG. 4 is a perspective view of the same, showing it in the position where three legs are conjointly swung open from a camera platform;

FIG. 5 is a perspective view of the same, showing it in the position where the left and right legs are swung open from the position of FIG. 4;

FIG. 6 is an explanatory perspective view of the same, showing the swing of the legs and the camera platform.

DESCRIPTION OF THE EMBODIMENT

Figure 1:
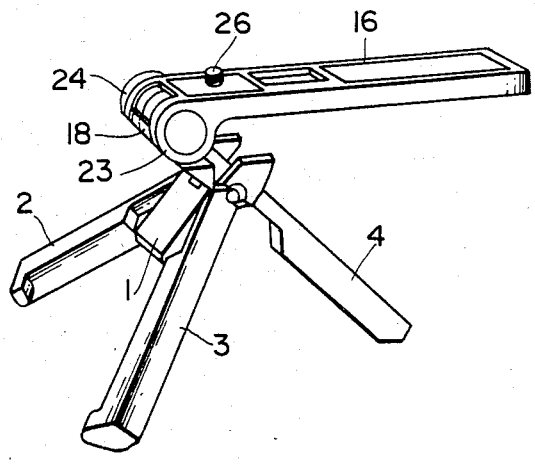
FIG. 1 is a perspective view of one form of a tripod embodying the present invention, showing it in the opened position.

A preferred embodiment of the present invention will now be described referring to the drawings.

A tripod for a camera according to the embodiment is so constructed that a left leg 2, a right leg 3 and a center leg 4 which are generally formed of a synthetic resin in a rectangular shape are pivotably connected to a leg-mounting plate 1 and a core metal member 18 which is fitted to a top end of the center leg 4 is pivotably connected to a camera platform 16.

The left leg 2 is pivotably connected by a stepped screw 7 to a left through-hole 5 and the right leg 3 is pivotably connected by a stepped screw 8 to a right through-hole 6 which is formed symmetrically in relation with the left through-hole 5. The pivotal movements of the left and right legs 2 and 3 are restrained by the leg-mounting plate 1. More specifically, the legs 2 and 3 are restrained, with respect to the rotation in the opening direction thereof, by the abutments of the upper corner portions of the left leg 2 and the right leg 3 against narrowed portions 9 and 10 of the leg-mounting plate 1, respectively, and they are restrained, with respect to the closing direction thereof, by the abutments of sides of the left leg 2 and the right leg 3 against sides 11 and 12 of the leg-mounting plate 1, respectively.

The left leg 2 and the right leg 3 are thus mounted on the leg-mounting plate 1 and adapted to be opened and closed in the lateral direction in a plane.

On the other hand, the center leg 4 is pivotably connected to an upper portion of the leg-mounting plate 1 by a pan-head screw 13. More particularly, the pan-head screw 13, around which the center leg 4 pivots, extends through a fork portion of the leg-mounting plate 1 at equal distance from the through-holes 5 and 6. An end of the screw 13 is engaged with a nut 13'. With this arrangement, the center leg 4 is allowed to swing, independently of the left and right legs 2 and 3, in a vertical plane containing a bisection of a triangle defined by the left and right legs 2 an 3 in their opened positions. The rotaion in the opening direction of the center leg 4 is restrained by the abutment of the upper end of a forward face of the center leg 4 against the base portion 14 of the fork portion of the leg-mounting plate 1. The rotation in the closing direction of the center leg 4 is restrained by the abutment of a forward end of a central portion of the center leg 4 against a lower rear face 15 of the leg-mounting plate 1.

Each of the legs has a detent means (not shown) for keeping it in its opened or closed position.

The camera platform 16 is fixed to a bottom of a camera by a screw 26 and the tripod as described above is relatively rotatably and tiltably mounted to the camera platform 16.

More particularly, a platform tilting pin 17 is fitted to the upper end of the center leg 4 in such a manner that it extends in a horizontal direction when the tripod is opened and placed on a horizontal plane. The core metal member 18 which is formed in a wedge shape is fitted to the platform tilting pin 17 through a hole 18' so that it may be tilted by about 13° in the directions shown by arrows in FIGS. 7(a) to (c). The core metal member 18 has a through-hole 19 which extends in a direction perpendicular to said vertical plane in which the center leg 4 is rotated. The core metal member 18 further has, at its central portion, a slit 20 which extends tranversing the through-hole 19 and reaching the hole 18'.

Figure 2:
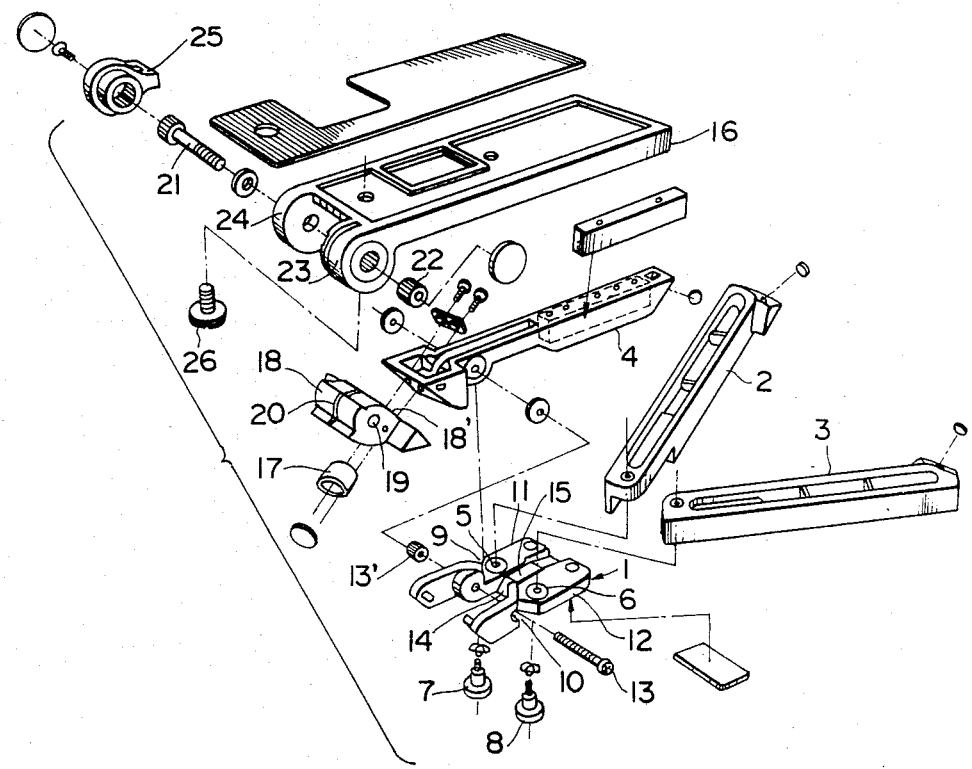
FIG. 2 is an exploded perspective view of the same.

The core metal member 18 is rotatably supported by bearings 23 and 24 projected from a left end (as viewed in FIG. 2) through a knurled bolt 21 extending through the through-hole 19 and a knurled nut 22. More specifically, a stem portion of the knurled bolt 21 extends through the bearing 24 of the platform 16, the core metal member 18 and the bearing 23 of the platform 16. The knurled nut is engaged with a tip end of the stem portion of the bolt 21. The inner face of the knurled nut 22 rotatably rests on the outer face of the core metal member 18. The knurled outer face of the nut 22 is meshed with a corresponding knurled inner face of the bearing 23 of the platform 16 so that it may slide in the axial direction of the bolt 21 and it may rotate conjointly with the bearing 23.

The knurled head of the bolt 21 is meshed with a lock lever 25. When the bolt 21 is rotated clockwise (as viewd in FIG. 2) by a lock lever 25, the nut 22 is drawn inwardly by the bolt 21 and the core metal member 18 is pressed against the bearing 24. As a result, the rotation of the platform 16 around the bolt 21 is locked. At the same time, the slit 20 is narrowed to reduce the diameter of the hole 18'. Thus, the rotation of the platform around the platform tilting pin 17 is also locked. When the lock lever 25 is rotated reversely, the lock is released.

The operation of the tripod in use will now be described.

First, three legs 2, 3 and 4 are rotated conjointly to lower them (FIG. 4) from their closed positions where they are folded under the platform 16 (FIG. 3). When the three legs 2, 3 and 4 are rotated to some extent where they make some appropriate angle to the platform 16, the left leg 2 and the right leg 3 are further rotated to their extremities, while restraining the center leg 4 by fingers (FIG. 5). Then, the legs 2 and 3 are opened, so that the three legs 2, 3 and 4 are opened to a stable position regulated by the respective rotation range preliminarily restrained (FIG. 6).

Figure 7A:
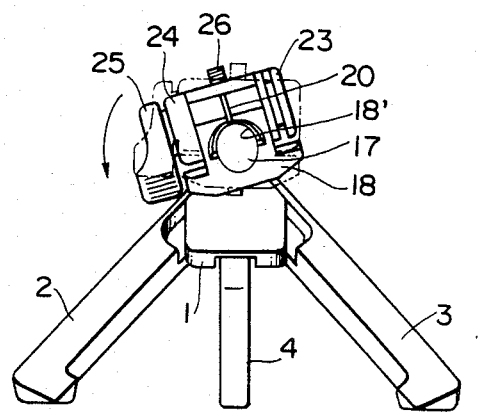
FIGS. 7(a), (b) and (c) are side elevational views showing the tilting of the camera platform, in the direction of arrow X in FIG. 6, as viewed from the direction indicated by arrow VII of FIG. 6.
Figure 7B:
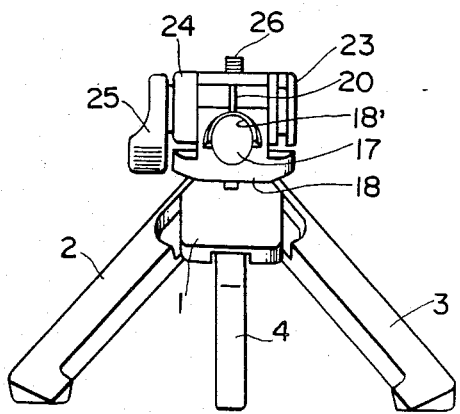
Figure 7C:
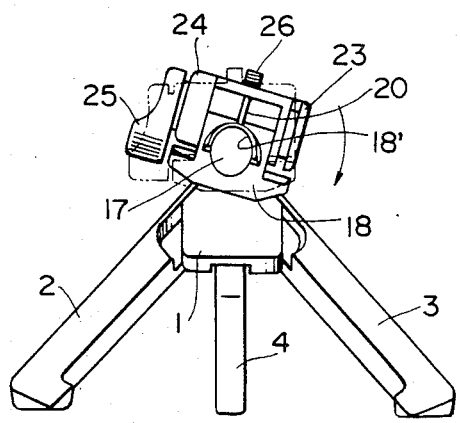

The camera platform 16 may be rotated in the same plane as the center leg 4 is rotated. In this case, the platform 16 may assume, for example, the vertical posture as shown by a phantom line in FIG. 6. The platform 16 may further be rotated around the platform tilting pin 17 as illustrated in FIGS. 7(a) to (c). Thus, the camera on the platform 16 can be set in a desired position.

To reinstate the tripod from the opened position to the closed position, the procedures as described above are traced backwardly.

I claim:

1. A tripod for a camera which comprises a left leg, a right leg and a center leg which are connected so as to extend adjacently in parallel with each other in the same plane when they are not used, said left leg and said right leg being pivotably connected, at a portion where the three legs are connected, so as to be swung within a predetermined angular range in said plane in the leftward and rightward directions, respectively, to be opened or closed, and said center leg being pivotably connected to said portion so as to swing in a direction perpendicular to said plane to be opened to closed.

* * * * *